United States Patent [19]

Hankawa

[11] Patent Number: 5,623,371
[45] Date of Patent: Apr. 22, 1997

[54] MACRO LENS SYSTEM

[75] Inventor: Masashi Hankawa, Hino, Japan

[73] Assignee: Olympus Optical Co., Ltd., Tokyo, Japan

[21] Appl. No.: 496,109

[22] Filed: Jun. 28, 1995

[30] Foreign Application Priority Data

Jun. 29, 1994 [JP] Japan .................................. 6-147413

[51] Int. Cl.$^6$ ...................................................... G02B 9/12
[52] U.S. Cl. ........................... 359/693; 359/792; 359/749
[58] Field of Search ...................................... 359/749–753, 359/693, 792

[56] References Cited

U.S. PATENT DOCUMENTS

| | | | |
|---|---|---|---|
| 4,178,076 | 12/1979 | Tsuji et al. | 359/693 |
| 4,807,983 | 2/1989 | Matsushita | 359/755 |
| 4,871,243 | 10/1989 | Ogawa et al. | 359/693 |
| 4,986,643 | 1/1991 | Moriyama | 359/693 |
| 5,007,720 | 4/1991 | Hamanishi | 359/791 |
| 5,331,465 | 7/1994 | Miyano | 359/792 |

*Primary Examiner*—Carolyn E. Fields
*Attorney, Agent, or Firm*—Cushman, Darby & Cushman IP Group of Pillsbury Madison & Sutro LLP

[57] ABSTRACT

The present invention provides a photographic lens system capable of close-up photography in which various aberrations such as spherical aberration and coma, and curvature of field are concurrently corrected in a well-balanced state and which is relatively bright as expressed by an F-number of about 2.8, and is characterized by comprising a first lens group $G_1$ which includes a front sub-group $G_{1F}$ having positive refracting power and a rear sub-group $G_{1R}$ having negative refracting power and has positive refracting power in its entirety, a second lens group $G_2$ having positive refracting power in its entirety, and a third lens group $G_3$ having positive refracting power in its entirety, the lens of the front sub-group $G_{1F}$ nearest to the image side being concave on the image side and the lens of the rear sub-group $G_R$ nearest to the object side being convex on the object side, and also characterized in that when the macro lens system is focused from the object point at infinity on the object point at a shorter distance, the first lens group $G_1$ including the front and rear lens sub-groups $G_{1F}$ and $G_{1R}$ and the second lens group $G_2$ are moved toward the object side while the third lens group $G_3$ is fixed.

17 Claims, 6 Drawing Sheets

MACRO LENS SYSTEM

BACKGROUND OF THE INVENTION

The present invention relates to a macro lens system, and more particularly to a photographic lens system that is relatively bright as expressed by an F-number of about 2.8 and enables every object from the object at infinity to a substantially life-size object to be continuously photographed.

So far, lenses capable of focusing on closer objects (close-up photography) have generally been designed such that aberrations at about $1/10$ can be predominantly corrected. For this reason, such lenses are still less satisfactory in terms of correction of aberrations at infinity than ordinarily used camera lenses. Among means known to solve this problem, there is a so-called floating mechanism wherein the air space between the respective lens groups is varied during focusing, thereby compensating for degradation of aberrations.

Some outcome has been accomplished by such a floating mechanism. However, this mechanism, although enabling spherical aberration, coma and the like to be well corrected, is still likely to give rise to some considerable variation of astigmatism and curvature of field. In particular, a noticeable field tilt on the object side often occurs, and this makes it difficult to obtain satisfactory performance over a range from the center to edge of the image plane.

SUMMARY OF THE INVENTION

In view of the above problems associated with the prior art, an object of the present invention is to provide a photographic lens system that is bright as represented by an F-number of about 2.8 and capable of focusing on closer objects, wherein various aberrations such as spherical aberration and coma, and curvature of field are concurrently corrected in a well-balanced state.

According to the present invention, the object mentioned as above is achieved by the provision of a photographic macro lens system capable of close-up photography, which comprises, in order from the object side, a first lens group, a second lens group and a third lens group, each having positive refracting power, characterized in that when said macro lens system is focused from the object point at infinity on the object point at a shorter distance, said first and second lens groups are moved farther away from said third lens group fixed with respect to the image plane, and said macro lens system comply with the following conditions:

$$0.8 < \phi 1 \cdot / \phi 1 MOD < 1.8 \qquad (1)$$

$$0.5 < \phi 2 / \phi < 1.5 \qquad (2)$$

$$0.5 < \beta 3 < 1.5 \qquad (3)$$

Here, $\phi$ is the refracting power of the overall system when focused at infinity, $\phi 1$ is the refracting power of the first lens group of the macro lens system when focused at infinity, $\phi 1 MOD$ is the refracting power of the first lens group of the macro lens system when focused to the shortest possible distance, $\phi 2$ is the refracting power of the second lens group of the macro lens system when focused at infinity, and $\beta 3$ is the magnification of the third lens of the macro lens system when focused at infinity.

Another macro lens system of the present invention is characterized in that it comprises, in order from the object side, a first lens group which is divided into a front sub-group having positive refracting power and a rear sub-group having negative refracting power and has positive refracting power in its entirety, a second lens group having positive refracting power in its entirety, and a third lens group having positive refracting power in its entirety, and when it is focused from the object point at infinity to the object point at a shorter distance, said first and second lens groups are moved toward the object side while said third lens group is fixed.

Still another macro lens system of the present invention is characterized in that it comprises, in order from the object side, a first lens group which includes a front sub-group having positive refracting power and a rear sub-group having negative refracting power and has positive refracting power in its entirety, a second lens group having positive refracting power in its entirety and a third lens group having positive refracting power in its entirety, the lens of said front sub-group nearest to the image side being convex on the image side and the lens of said rear sub-group nearest to the object side being convex on the object side, and when it is focused from the object point at infinity on the object point at a shorter distance, said first lens group including said front and rear sub-groups and said second lens group are moved toward the object side while said third lens group is fixed.

A detailed account will now be given of why the above lens system is designed and how it works.

In the macro lens system, constructed as above, of the present invention, the first and second lens groups are moved farther away from the image plane with their space varying, whereby variations of spherical aberration and coma are corrected and, at the same time, a large field tilt on the object side is prevented during focusing to a shorter distance. Variations of astigmatism and distortion are corrected by increasing the space between the second and third lens groups. Furthermore in this case, the third lens group having positive refracting power is located nearest to the image side to disperse positive refracting power likely to be biased to the first and second lens groups, whereby variations of aberrations can be reduced even when focusing on the object at a short distance.

It is preferable that the first lens group is divided to two subordinate groups, i.e., a front sub-group and a rear sub-group as viewed in order from the object side, because curvature of field can be effectively corrected by varying the space between these sub-groups in association with focusing. Condition (1) defines the refractive power ratio of the first lens group when focusing at infinity and to the shortest possible distance, which varies with a change in the space between the front and rear lens sub-groups. Exceeding the upper limit of 1.8 in condition (1) is not preferable for the purpose of the present invention, because there is a large field tilt when focusing to the shortest possible distance. When the lower limit of 0.8 is not reached, on the other hand, the refracting power of the first lens group during focusing to the shortest possible distance is stronger than that during focusing at infinity; so various aberrations, especially spherical aberration become too large for correction.

Condition (2) defines the ratio between the refracting power of the second lens group and the overall refracting power of the lens system when the lens system is focused at infinity, and substantially defines the refracting power of the second lens group when the system is focused at infinity. Exceeding the upper limit of 1.5 is not preferable, not only because variations of various aberrations become pronounced but also because the second lens group becomes too sensitive to lens production tolerance. When the lower limit of 0.5 is not reached or when the refracting power of the second lens group decreases, the amount of movement of the first and second lens groups for focusing increases, resulting in a manipulation problem.

Condition (3) defines the lateral magnification of the third lens group during focusing at infinity. Exceeding the upper limit of 1.5 makes it likely for the third lens group to have negative refracting power, and so departs from the essential purpose of the present invention that variations of aberrations are reduced by the dispersion of refracting power. When the lower limit of 0.5 is not reached or when the lateral magnification of the third lens unit becomes low, the height of off-axis rays incident on the third lens group increases, resulting in an increased lens diameter which is unfavorable for manipulation.

One preferable embodiment of the macro lens system according to the present invention will be given below. The first lens group consists of, in order from the object side, at least two positive lenses and a negative lens having a concave surface of great curvature on the image side, so that the required refracting power can be obtained with well-corrected spherical aberration and chromatic aberration. The second lens group is made up of a doublet of a negative lens having a concave surface of great curvature on the object side and a positive lens, and at least one positive lens, so that the required refracting power can be obtained with well-corrected spherical aberration and chromatic aberration. The third lens group consists of a positive lens combined with a negative lens, so that a variation of chromatic aberration occurring by the movement of the lens groups for focusing can be reduced.

Still other objects and advantages of the present invention will in part be obvious and will in part be apparent from the specification.

The present invention accordingly comprises the features of construction, combinations of elements, and arrangement of parts which will be exemplified in the construction hereinafter set forth, and the scope of the present invention will be indicated in the claims.

DESCRIPTION OF THE PREFERRED EMBODIMENTS

Set out below are Examples 1–4 of the macro lens systems according to the present invention.

A first account will be given of the construction of each example, the data about which will be enumerated later. The macro lens system according to Example 1 of the present invention consists of three groups or nine lenses in all, as can be seen from the sectional view of FIG. 1(a) when focused on the object point at infinity, the sectional view of FIG. 1(b) when focused at a magnification of −0.10 or on the object point at a shorter distance, and the sectional view of FIG. 1(c) when focused at a magnification of −0.979 or on the object point at the shortest possible distance. More illustratively, it consists of, in order from the object side, a first lens group $G_1$ divided into front and rear subgroups $G_{1F}$ and $G_{1R}$, a second lens group $G_2$ and a third lens group $G_3$. To focus this macro lens system from infinity on the object at the shortest possible distance, the first and second lens groups $G_1$ and $G_2$ are moved farther away from the image plane. In the meantime, the space between the front and rear sub-groups $G_{1F}$ and $G_1R$ is decreased with the space between the rear sub-group $G_{1R}$ and the second lens group $G_2$ increased and then decreased. This enables variations of aberrations to be reduced.

Figure 1A:
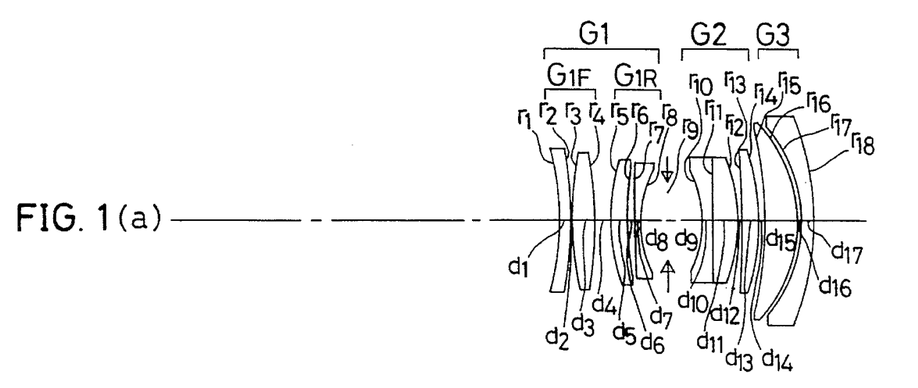
FIG. 1 is sectional views of the micro lens system according to Example 1 of the present invention when focused on object points.
Figure 1B:
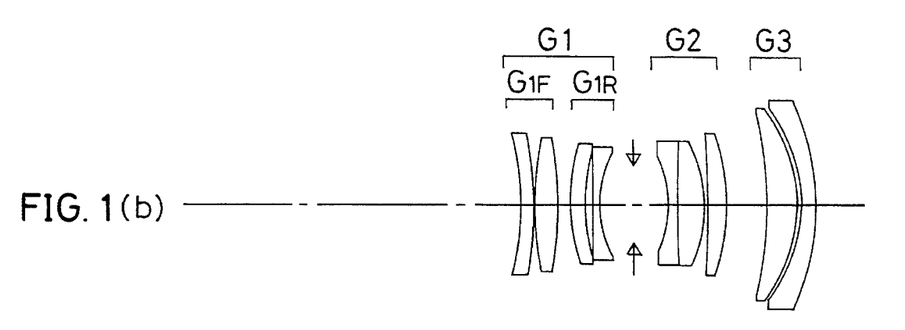
Figure 1C:
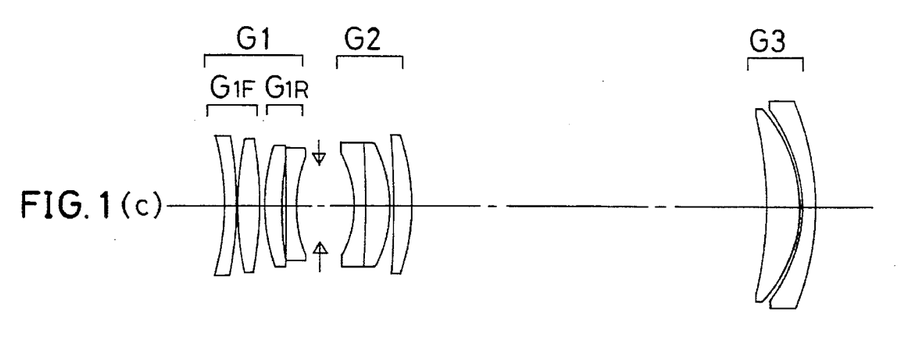

More specifically, the front sub-group $G_{1F}$ of the first lens group $G_1$ consists of a negative meniscus lens convex on the image side and a double-convex lens, the rear sub-group $G_{1R}$ of the first lens group $G_1$ consists of a positive meniscus lens convex on the object side and a negative meniscus lens convex on the object side, the second lens group $G_2$ consists of a doublet of a negative meniscus lens convex on the image side and a positive meniscus lens convex on the image side and a positive meniscus lens convex on the image side, and the third lens group $G_3$ consists of a positive meniscus lens convex on the image side and a negative meniscus lens convex on the image side.

Figures 2A, 2B, 2C:
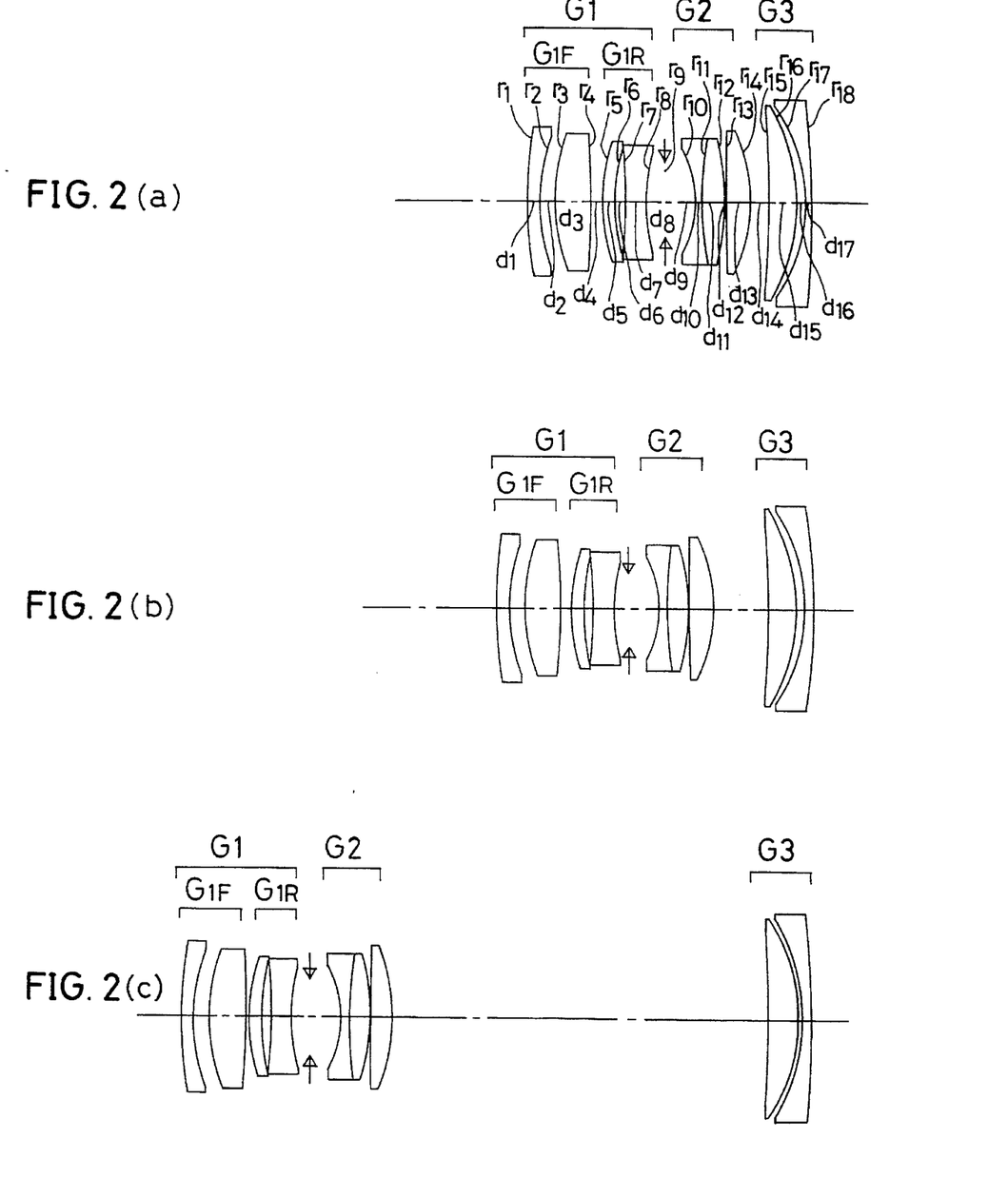
FIG. 2 is sectional views of the macro lens system according to Example 2 when focused object points.

The macro lens system according to Example 2 of the present invention comprises three lens groups or nine lenses in all, as can be seen from the sectional view of FIG. 2(a) when focused on the object point at infinity, the sectional view of FIG. 2(b) when focused at a magnification of −0.10 or the object point at a shorter distance, and the sectional view of FIG. 2(c) when focused at a magnification of −1.00 or the object point at the shortest possible distance. More illustratively, it consists of, in order from the object side, a first lens group $G_1$ divided into front and rear sub-groups $G_{1F}$ and $G_{1R}$, a second lens group $G_2$ and a third lens group $G_3$, with one aspheric surface used for the second lens group, so that various aberrations can be well corrected. To focus this macro system from infinity on the object at the shortest possible distance, the space between the front and rear sub-groups $G_{1F}$ and $G_{1R}$ is decreased, while the space between the first and second lens groups $G_1$ and $G_2$ is once decreased and then increased, so that variations of various aberrations can be reduced.

More specifically, the front sub-group $G_{1F}$ of the first lens group $G_1$ consists of a negative meniscus lens convex on the object side and a double-convex lens, the rear sub-group $G_{1R}$ of the first lens group $G_1$ consists of a positive meniscus lens convex on the object side and a double-concave lens, the second lens group $G_2$ consists of a doublet of a double-concave lens and a double-convex lens and a positive meniscus lens convex on the image side, and the third lens group $G_3$ consists of a positive meniscus lens convex on the image side and a negative meniscus lens convex on the image side. An aspheric surface is used for the image-side surface of the double-convex lens of the doublet of the second lens group $G_2$.

Figure 3A:
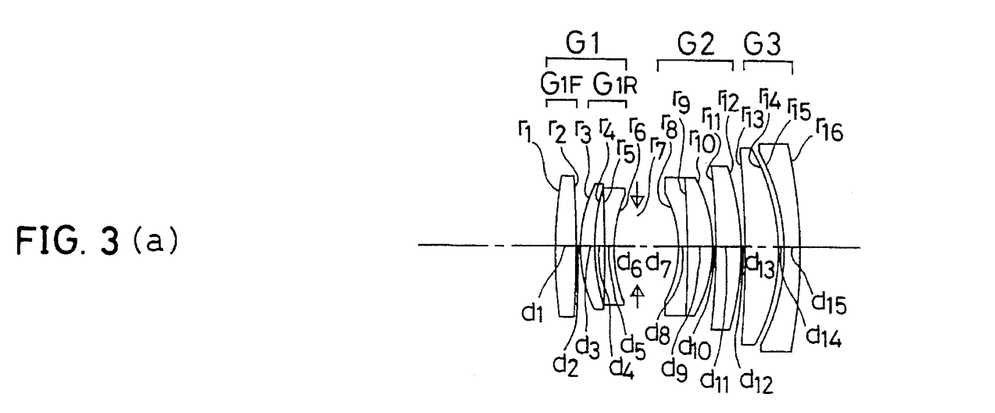
FIG. 3 is sectional views of the macro lens system according to Example 3 when focused on object points.
Figure 3B:
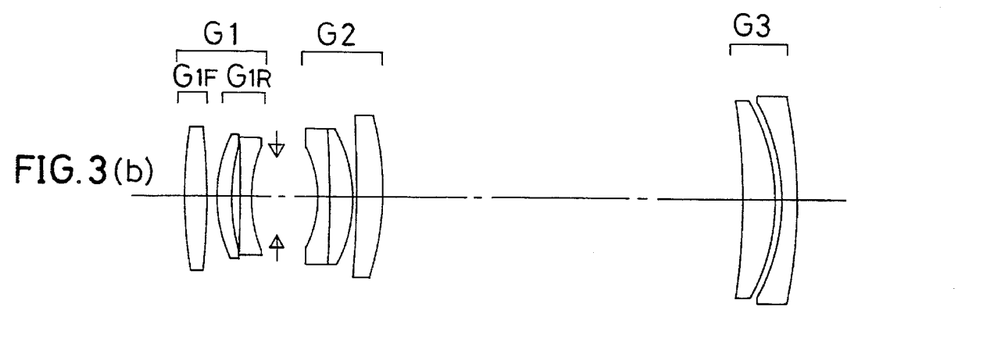

The macro lens system according to Example 3 of the present invention comprises three lens groups or eight lenses in all, as can be seen from FIG. 3(a) showing in section the macro lens system when focused on the object point at infinity, and FIG. 3(b) showing in section the macro lens system when focused at a magnification of −0.986 or the object point at the shortest possible distance, and consists of, in order from the object side, a first lens group $G_1$ divided into front and rear sub-groups $G_{1F}$ and $G_{1R}$, a second lens group $G_2$ and a third lens group $G_3$, provided however that the negative lens nearest to the object side is omitted from Example 1 or 2. To focus the macro lens system from infinity to the object at the shortest possible distance, while the first and second lens groups $G_1$ and $G_2$ are moved toward the object side, the spaces between the front and rear sub-groups $G_{1F}$ and $G_{1R}$, and the rear sub-groups $G_{1R}$ and the second lens group $G_2$ are increased, respectively, so that aberration variations can be reduced.

More specifically, the front sub-group $G_{1F}$ of the first lens group $G_1$ consists of a double-convex lens, the rear sub-group $G_{1R}$ of the first lens group $G_1$ consists of a positive meniscus lens convex on the object side and a negative meniscus lens convex on the object side, the second lens group $G_2$ consists of a doublet of a negative meniscus lens convex on the image side and a positive meniscus lens convex on the image side, and the third lens group $G_3$ consists of a positive meniscus lens convex on the image side and a negative meniscus lens convex on the image side.

Figure 4A:
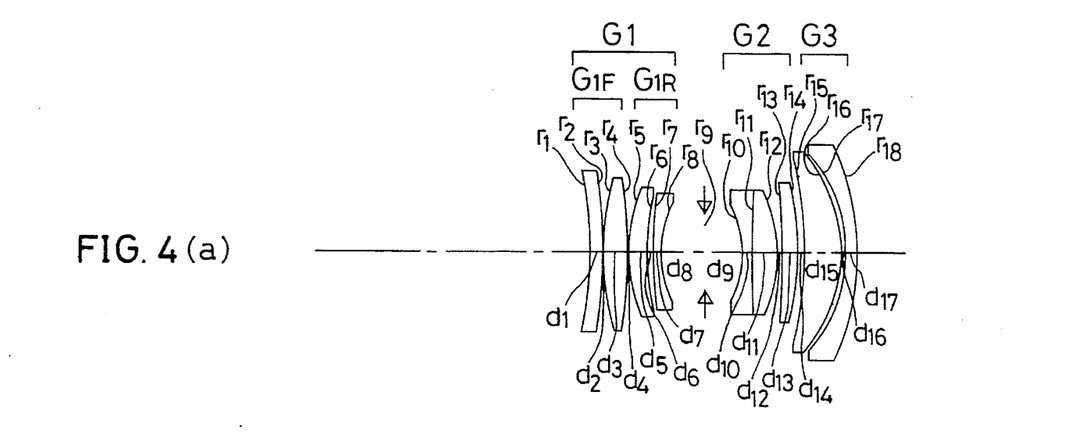
FIG. 4 is sectional views of the macro lens system according to Example 4 when focused object points.
Figure 4B:
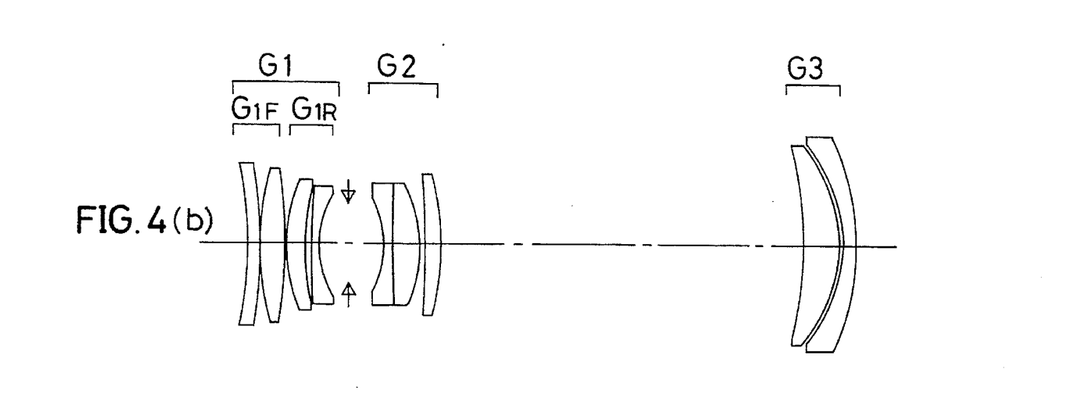

The macro lens system according to Example 4 of the present invention comprises three groups or nine lenses in all, as can be seen from FIG. 4(a) showing in section the macro lens system when focused on the object point at infinity and FIG. 4(b) showing in section the macro lens system when focused at a magnification of −0.974 or the object point at the shortest possible distance, and consists of, in order from the object side, a first lens group $G_1$ divided into front and rear sub-groups $G_{1F}$ and $G_{1R}$, a second lens group $G_2$ and a third lens group $G_3$. To focus the macro lens system from infinity to the object at the shortest possible distance, while the first and second lens groups $G_1$ and $G_2$ are moved toward the object side, the space between the first and second lens groups $G_1$ and $G_2$ is once increased and then decreased, so that aberration variations can be reduced. This macro lens system is of the type wherein the space between the front and rear sub-groups $G_{1F}$ and $G_{1R}$ is not changed by focusing with no change in the refracting power of the first lens group $G_1$.

More specifically, the front sub-group $G_{1F}$ of the first lens group $G_1$ consists of a negative meniscus lens convex on the image side and a double-convex lens, the rear sub-group $G_{1R}$ of the first lens group $G_1$ consists of a positive meniscus lens convex on the object side and a negative meniscus lens convex on the object side, the second lens group $G_2$ consists of a doublet of a negative meniscus lens convex on the image side and a positive meniscus lens convex on the image side and a positive meniscus lens convex on the image side, and the third lens group $G_3$ consists of a positive meniscus lens convex on the image side and a negative meniscus lens convex on the image side.

Enumerated below are numerical data about each of the above Examples 1–4. The symbols used hereinafter but not hereinbefore are:

f is the focal length of the overall lens system when focused at infinity, $F_{NO}$ is the F-number of the lens system when focused at infinity, 2ω is the field angle of the lens system when focused at infinity, $r_1, r_2 \ldots$ are the radii of curvature of the respective lenses, $d_1, d_2 \ldots$ are the space between the respective lens surfaces, $n_{d1}, n_{d2} \ldots$ are the d-line indices of refraction of the respective lenses, and $\nu_{d1}, \nu_{d2} \ldots$ are the Abbe's number of the respective lenses.

In the focusing spaces to be described later, s' is object point distance and β is lateral magnification. Now let x and y denote the direction of propagation of light on the optical axis and the direction perpendicular to the optical axis, respectively. Aspheric shape is then represented by $$x=(y^2/r)/[1+\{1-(y/r)^2\}^{1/2}]+A_4y^4+A_6y^6+A_8y^8+A_{10}y^{10}$$

where r is the paraxial radius of curvature, and $A_4$, $A_6$, $A_8$ and $A_{10}$ are the fourth, sixth, eighth and tenth-order aspherical coefficients, respectively.

EXAMPLE 1

| f = 51.25 mm, $F_{NO}$ = 2.85, 2ω = 46.12° | | |
|---|---|---|
| $r_1$ = −39.2667 | $d_1$ = 1.700 | $n_{d1}$ = 1.74077 $\nu_{d1}$ = 27.79 |
| $r_2$ = −78.0650 | $d_2$ = 0.140 | |
| $r_3$ = 52.2906 | $d_3$ = 3.399 | $n_{d2}$ = 1.83481 $\nu_{d2}$ = 42.72 |
| $r_4$ = −71.9177 | $d_4$ = (Variable) | |
| $r_5$ = 24.7464 | $d_5$ = 2.694 | $n_{d3}$ = 1.83481 $\nu_{d3}$ = 42.72 |
| $r_6$ = 49.8603 | $d_6$ = 0.840 | |
| $r_7$ = 451.2577 | $d_7$ = 1.150 | $n_{d4}$ = 1.57501 $\nu_{d4}$ = 41.49 |
| $r_8$ = 17.4021 | $d_8$ = (Variable) | |
| $r_9$ = ∞ (Stop) | $d_9$ = 5.140 | |
| $r_{10}$ = −14.4520 | $d_{10}$ = 1.450 | $n_{d5}$ = 1.69895 $\nu_{d5}$ = 30.12 |
| $r_{11}$ = −653.4820 | $d_{11}$ = 4.094 | $n_{d6}$ = 1.77250 $\nu_{d6}$ = 49.60 |
| $r_{12}$ = −20.0807 | $d_{12}$ = 0.298 | |
| $r_{13}$ = −108.7353 | $d_{13}$ = 2.382 | $n_{d7}$ = 1.83481 $\nu_{d7}$ = 42.72 |
| $r_{14}$ = −34.3854 | $d_{14}$ = (Variable) | |
| $r_{15}$ = −60.7588 | $d_{15}$ = 4.977 | $n_{d8}$ = 1.58144 $\nu_{d8}$ = 40.77 |
| $r_{16}$ = −21.6357 | $d_{16}$ = 0.554 | |
| $r_{17}$ = −21.4059 | $d_{17}$ = 1.900 | $n_{d9}$ = 1.83400 $\nu_{d9}$ = 37.17 |
| $r_{18}$ = −38.0724 | | |

| Focusing Spaces | | | |
|---|---|---|---|
| | s' = ∞ | β = −0.10 | β = −0.979 |
| $d_4$ | 2.0797 | 1.8150 | 0.4000 |
| $d_8$ | 3.8711 | 4.7744 | 3.5918 |
| $d_{14}$ | 0.8300 | 6.0191 | 52.2127 |

$\phi_1/\phi_{1MOD}$ = 1.037
$\phi_2/\phi$ = 0.792
$\beta_3$ = 0.996

EXAMPLE 2

| f = 50.00 mm, $F_{NO}$ = 2.80, 2ω = 47.41° | | |
|---|---|---|
| $r_1$ = 68.7064 | $d_1$ = 1.700 | $n_{d1}$ = 1.80610 $\nu_{d1}$ = 40.95 |
| $r_2$ = 26.2445 | $d_2$ = 2.327 | |
| $r_3$ = 25.8586 | $d_3$ = 5.500 | $n_{d2}$ = 1.81554 $\nu_{d2}$ = 44.36 |
| $r_4$ = −142.1650 | $d_4$ = (Variable) | |
| $r_5$ = 29.3460 | $d_5$ = 1.920 | $n_{d3}$ = 1.83481 $\nu_{d3}$ = 42.72 |
| $r_6$ = 35.8017 | $d_6$ = 1.592 | |
| $r_7$ = −66.5874 | $d_7$ = 2.968 | $n_{d4}$ = 1.58144 $\nu_{d4}$ = 40.77 |
| $r_8$ = 30.5368 | $d_8$ = (Variable) | |
| $r_9$ = ∞ (Stop) | $d_9$ = 5.276 | |
| $r_{10}$ = −16.9524 | $d_{10}$ = 1.150 | $n_{d5}$ = 1.69895 $\nu_{d5}$ = 30.12 |
| $r_{11}$ = 64.7026 | $d_{11}$ = 3.273 | $n_{d6}$ = 1.77250 $\nu_{d6}$ = 49.60 |
| $r_{12}$ = −33.5334 (Aspheric) | $d_{12}$ = 0.140 | |
| $r_{13}$ = −546.6155 | $d_{13}$ = 3.677 | $n_{d7}$ = 1.83481 $\nu_{d7}$ = 42.72 |
| $r_{14}$ = −24.8379 | $d_{14}$ = (Variable) | |

-continued

| $r_{15} = -622.9217$ | $d_{15} = 4.800$ | $n_{d8} = 1.51009$ $v_{d8} = 63.63$ |
|---|---|---|
| $r_{16} = -25.9229$ | $d_{16} = 0.929$ | |
| $r_{17} = -25.4089$ | $d_{17} = 1.150$ | $n_{d9} = 1.62280$ $v_{d9} = 57.06$ |
| $r_{18} = -113.0229$ | | |

Focusing Spaces

| | $s' = \infty$ | $\beta = -0.10$ | $\beta = -1.00$ |
|---|---|---|---|
| $d_4$ | 1.6251 | 1.4670 | 0.4000 |
| $d_8$ | 2.0000 | 1.2920 | 2.0000 |
| $d_{14}$ | 2.3976 | 7.7494 | 55.0738 |

Aspherical Coefficients

12th surface
$A_4 = 0.96470 \times 10^{-5}$
$A_6 = 0.49878 \times 10^{-7}$
$A_8 = -0.53776 \times 10^{-9}$
$A_{10} = 0.32522 \times 10^{-11}$
$\phi_1/\phi_{1MOD} = 1.300$
$\phi_2/\phi = 1.092$
$\beta_3 = 0.981$

EXAMPLE 3

$f = 50.00$ mm, $F_{NO} = 2.80$, $2\omega = 47.43°$

| $r_1 = 68.7064$ | $d_1 = 3.196$ | $n_{d1} = 1.80300$ $v_{d1} = 46.66$ |
|---|---|---|
| $r_2 = -199.4073$ | $d_2 = $ (Variable) | |
| $r_3 = 21.1341$ | $d_3 = 2.369$ | $n_{d2} = 1.77250$ $v_{d2} = 49.60$ |
| $r_4 = 32.8751$ | $d_4 = 1.001$ | |
| $r_5 = 164.0109$ | $d_5 = 1.603$ | $n_{d3} = 1.59551$ $v_{d3} = 39.21$ |
| $r_6 = 18.9217$ | $d_6 = $ (Variable) | |
| $r_7 = \infty$ (Stop) | $d_7 = 6.602$ | |
| $r_8 = -13.7437$ | $d_8 = 1.209$ | $n_{d4} = 1.69895$ $v_{d4} = 30.12$ |
| $r_9 = -130.9168$ | $d_9 = 3.869$ | $n_{d5} = 1.77250$ $v_{d5} = 49.60$ |
| $r_{10} = -18.4010$ | $d_{10} = 0.140$ | |
| $r_{11} = -196.6009$ | $d_{11} = 3.915$ | $n_{d6} = 1.81554$ $v_{d6} = 44.36$ |
| $r_{12} = -36.0406$ | $d_{12} = $ (Variable) | |
| $r_{13} = -126.3890$ | $d_{13} = 5.131$ | $n_{d7} = 1.71700$ $v_{d7} = 47.94$ |
| $r_{14} = -26.9157$ | $d_{14} = 1.083$ | |
| $r_{15} = -25.7261$ | $d_{15} = 1.800$ | $n_{d8} = 1.83481$ $v_{d8} = 42.72$ |
| $r_{16} = -72.1424$ | | |

Focusing Spaces

| | $s' = \infty$ | $\beta = -0.986$ |
|---|---|---|
| $d_2$ | 0.4000 | 1.5000 |
| $d_6$ | 3.0372 | 3.5000 |
| $d_{12}$ | 0.5000 | 52.2678 |

$\phi_1/\phi_{1MOD} = 0.972$
$\phi_2/\phi = 0.920$
$\beta_3 = 0.974$

EXAMPLE 4

$f = 51.25$ mm, $F_{NO} = 2.85$, $2\omega = 46.22°$

| $r_1 = -46.5229$ | $d_1 = 1.700$ | $n_{d1} = 1.74077$ $v_{d1} = 27.79$ |
|---|---|---|
| $r_2 = -92.1781$ | $d_2 = 0.140$ | |
| $r_3 = 43.8548$ | $d_3 = 3.399$ | $n_{d2} = 1.83481$ $v_{d2} = 42.72$ |
| $r_4 = -113.7258$ | $d_4 = 0.400$ | |
| $r_5 = 24.1658$ | $d_5 = 2.694$ | $n_{d3} = 1.83481$ $v_{d3} = 42.72$ |
| $r_6 = 41.0233$ | $d_6 = 0.840$ | |
| $r_7 = 94.3732$ | $d_7 = 1.150$ | $n_{d4} = 1.57501$ $v_{d4} = 41.49$ |
| $r_8 = 16.2732$ | $d_8 = $ (Variable) | |
| $r_9 = \infty$ (Stop) | $d_9 = 4.385$ | |
| $r_{10} = -13.3928$ | $d_{10} = 1.450$ | $n_{d5} = 1.69895$ $v_{d5} = 30.12$ |
| $r_{11} = -517.0778$ | $d_{11} = 4.094$ | $n_{d6} = 1.77250$ $v_{d6} = 49.60$ |
| $r_{12} = -18.2778$ | $d_{12} = 0.298$ | |
| $r_{13} = -102.6010$ | $d_{13} = 2.382$ | $n_{d7} = 1.83481$ $v_{d7} = 42.72$ |

-continued $f = 51.25$ mm, $F_{NO} = 2.85$, $2\omega = 46.22°$

| $r_{14} = -35.3916$ | $d_{14} = $ (Variable) | |
|---|---|---|
| $r_{15} = -57.9973$ | $d_{15} = 5.500$ | $n_{d8} = 1.58144$ $v_{d8} = 40.77$ |
| $r_{16} = -20.9649$ | $d_{16} = 0.554$ | |
| $r_{17} = -20.6841$ | $d_{17} = 1.900$ | $n_{d9} = 1.83400$ $v_{d9} = 37.17$ |
| $r_{18} = -35.4807$ | | |

Focusing Spaces

| | $s' = \infty$ | $\beta = -0.974$ |
|---|---|---|
| $d_8$ | 7.5599 | 5.3326 |
| $d_{14}$ | 0.8300 | 53.2742 |

$\phi_1/\phi_{1MOD} = 1.000$
$\phi_2/\phi = 0.785$
$\beta_3 = 0.971$

Figure 5:
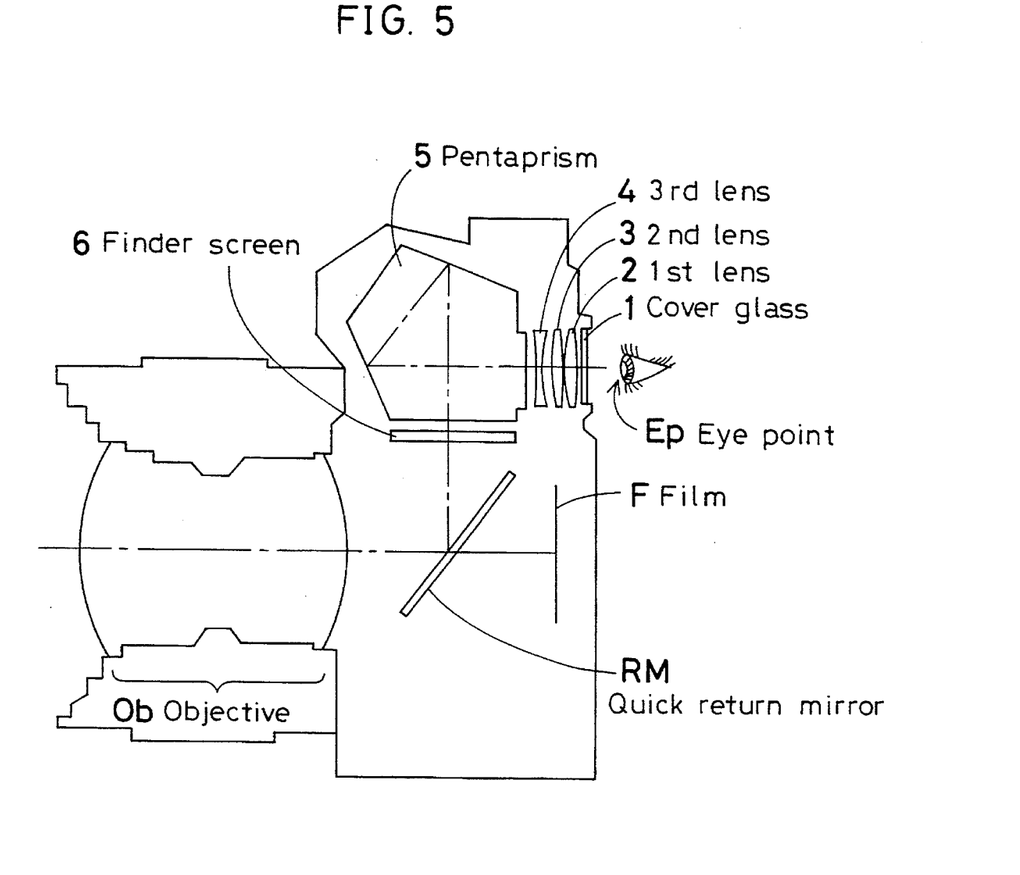
FIG. 5 is a general schematic of a single-lens reflex camera on which the micro lens system of the present invention is used.

Each of the macro lens systems according to Examples 1–4 of the present invention may be used as an objective Ob for a single-lens reflex camera schematically shown in FIG. 5. More illustratively, the single-lens reflex camera is designed such that light from the subject is directed through the objective Ob to film F on which the image of the subject is formed. To help the camera operator take aim at the subject being photographed and determine what picture is composed, a quick return mirror RM is retractably mounted within the optical path between the objective Ob and the film F. The objective Ob captures light from the subject through the quick return mirror RM to cast the image on a finder screen 6. The image of the subject formed on the finder screen 6 is magnified by finder optical systems 1–4 through a pentaprism 5, so that the viewer can see the thus magnified image at a position shown by an eye point EP. To accommodate to the viewer's diopter at this time, for instance, first and second lenses 2 and 3 are moved along the optical axis of the finder optical systems. This makes it possible for the viewer to view the image of the subject at a position best suited for this purpose.

Figure 6:
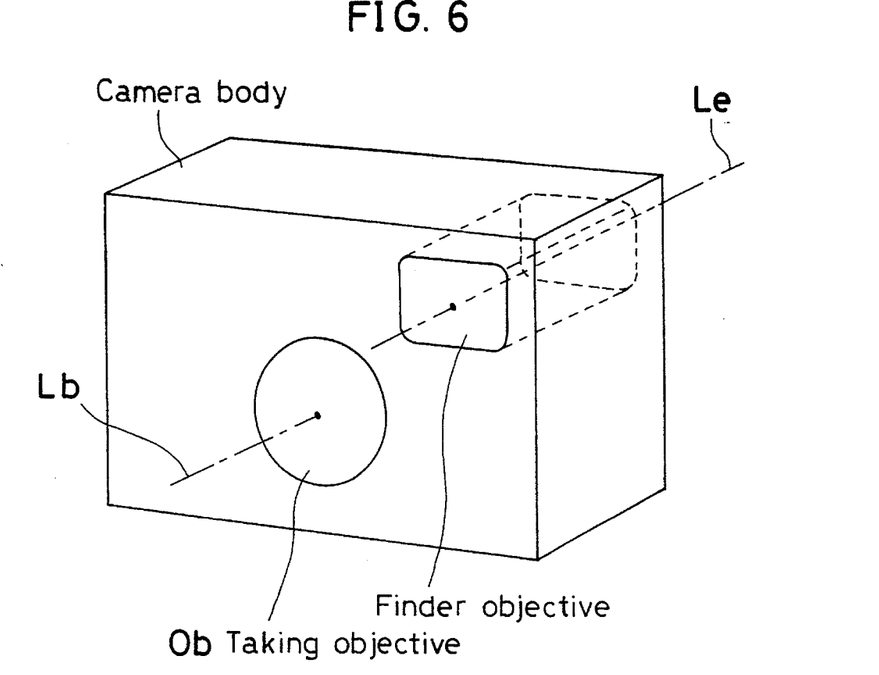
FIG. 6 is a perspective schematic of a compact camera on which the macro lens system of the present invention is used.
Figure 7:
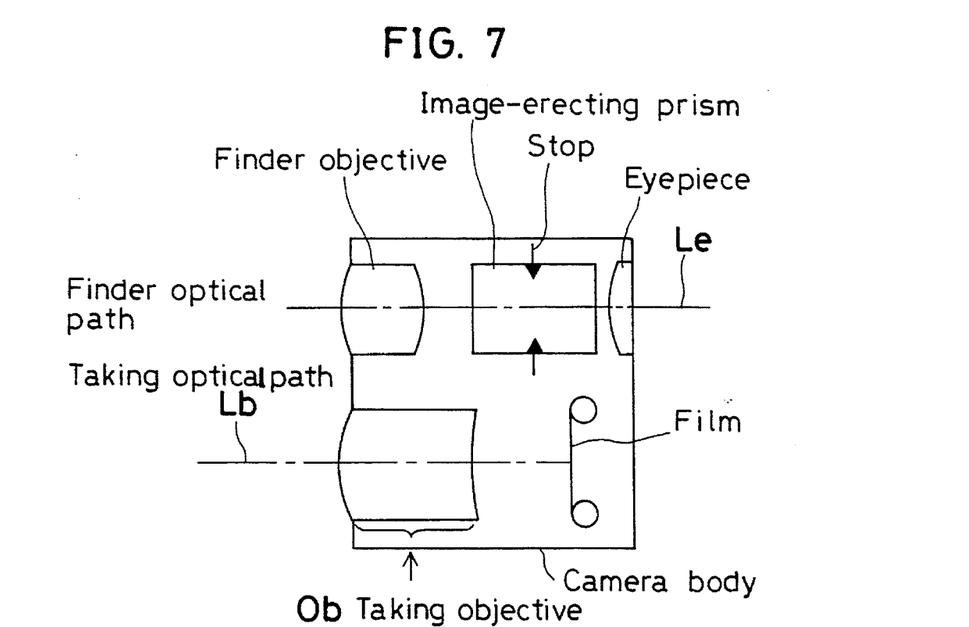
FIG. 7 is a sectional schematic of the compact camera shown in FIG. 6.

Each of the exemplified macro lens systems according to the present invention may also be used as a taking objective Ob for a compact camera shown in perspective and section in FIGS. 6 and 7, wherein Lb represents a taking optical path and Le finder optical path. With the optical paths Lb and Le arranged in parallel to each other, the image of the subject being photographed is viewed through a finder made up of a finder objective, an image-erecting prism, a stop and an eyepiece, and is cast by the taking objective Ob onto film.

As detailed above and as can be understood from each example, by use of the present application it is possible to achieve a photographic lens system in which variations of various aberrations, especially of astigmatism and curvature of field when it is focused on the object point at a shorter distance, are sufficiently corrected, and which is relatively bright as expressed by an F-number of about 2.8 and enables every object from the object at infinity to an approximately life-size object to be continuously photographed.

What we claim is:

1. A photographic macro lens system capable of close-up photography, which consists of, in order from an object side:
    a first lens group having a positive refracting power;
    a second lens group having a positive refracting power; and
    a third lens group having a positive refracting power, characterized in that said macro lens system is focused from an object point at infinity to an object point at a shorter distance by moving said first and second lens groups farther away from said third lens group;

wherein said third lens group is fixed with respect to an image plane;

wherein said first and said second lens groups are moved such that a space reserved therebetween is varied, and said macro lens system complies with the following conditions:

$$0.8 < \phi1 / \phi1MOD < 1.8 \quad (1)$$

$$0.5 < \phi2/\phi < 1.5 \quad (2)$$

$$0.5 < \beta3 < 1.5 \quad (3)$$

where $\phi$ is refracting power of the overall system when focused at infinity, $\phi1$ is refracting power of the first lens group of said macro lens system when focused at infinity, $\phi1MOD$ is refracting power of the first lens group of said macro lens system when focused to a shortest possible distance, $\phi2$ is a refracting power of the second lens group of said macro lens system when focused at infinity, and $\beta3$ magnification of the third lens of said macro lens system when focused at infinity.

2. A macro lens system consisting of, in order from an object to an image side:

a first lens group which is divided into a front sub-group having positive refracting power and a rear sub-group having negative refracting power, said first lens group having positive refracting power in its entirety;

a second lens group having positive refracting power in its entirety; and a third lens group having positive refracting power in its entirety, and characterized in that said macro lens system is focused from an object point at infinity to an object point at a shorter distance by moving said first and second lens groups toward said object side, wherein said third lens is fixed, and wherein said first and said second lens groups are moved such that a space reserved therebetween is varied.

3. A macro lens system comprising, in order from an object side:

a first lens group which includes a front sub-group having positive refractive power and a rear sub-group having negative refracting power, said first lens group having positive refracting power in its entirety;

a second lens group having positive refracting power in its entirety; and a third lens group having positive refracting power in its entirety, wherein a lens of said front sub-group nearest to said image side being convex on said image side and a lens of said rear sub-group nearest to said object side being convex on said object side, and characterized in that:

when said macro lens is focused from an object point at infinity to an object point at a shorter distance, said first lens group, which includes said front and rear lens sub-groups, and said second lens group are moved toward the object side while said third lens group is fixed.

4. A macro lens system according to claim 3, characterized in that said rear sub-group includes a meniscus lens and a double-concave lens.

5. A macro lens system according to claim 3, characterized in that during said focusing, a space between said front sub-group and said rear sub-group is decreased.

6. A macro lens system according to claim 3, characterized in that during said focusing, a space between said front sub-group and said rear sub-group is increased.

7. A macro lens system according to claim 3, characterized in that during said focusing, a space between said front sub-group and said rear sub-group is fixed.

8. A macro lens system according to any one of claims 1, 2, or 3, characterized in that during said focusing, a space between said first lens group and said second lens group is increased from the object point at infinity to the object point at an intermediate distance, and decreased from said object point at an intermediate distance, and decreased from said object point at an intermediate distance to the object point at a shortest possible distance.

9. A macro lens system according to any one of claims 1, 2, or 3, characterized in that during said focusing, a space between said first lens group and said second lens group is decreased from said object point at infinity to an object point at an intermediate distance, and increased from said object point at said intermediate distance to said object point at a shortest possible distance.

10. A macro lens system according to any one of claims 1, 2, or 3, characterized in that during said focusing, a space between said first lens group and said second lens group is increased.

11. A macro lens system according to any one of claims 1, 2, or 3, characterized in that during said focusing, a space between said second lens group and said third lens group is increased.

12. A macro lens system according to claim 2 or 3, characterized by complying with the following condition (1):

$$0.8 < \phi1 / \phi1MOD < 1.8 \quad (1)$$

where:

$\phi1$ is the refracting power of the first lens group of said macro lens system when focused at infinity, and $\phi1MOD$ is the refracting power of the first lens group of said macro lens system when focused to a shortest possible distance.

13. A macro lens system according to claim 2 or 3, characterized by complying with the following condition (2):

$$0.5 < \phi2/\phi < 1.5 \quad (2)$$

where:

$\phi$ is the refracting power of the overall system when focused at infinity, and $\phi2$ is the refracting power of the second lens group of said macro lens system when focused at infinity.

14. A macro lens system according to claim 2 or 3, characterized by complying with the following condition (3):

$$0.5 < \beta3 < 1.5 \quad (3)$$

where:

$\beta3$ is the magnification of the third lens of said macro lens system when focused at infinity.

15. A macro lens system comprising, in order from an object to an image side:

a first lens group which is divided into a front sub-group having positive refracting power and a rear sub-group having negative refracting power, said first lens group having positive refracting power in its entirety;

a second lens group having positive refracting power in its entirety; and a third lens group having positive refracting power in its entirety, and characterized in that said macro lens system is focused from an object point at infinity to an object point at a shorter distance by moving said first and second lens groups toward said object side, wherein said third lens is fixed, and wherein said rear sub-group includes a meniscus lens and a double-concave lens.

16. A macro lens system comprising, in order from an object to an image side:

a first lens group which is divided into a front sub-group having positive refracting power and a rear sub-group having negative refracting power, said first lens group having positive refracting power in its entirety;

a second lens group having positive refracting power in its entirety; and a third lens group having positive refracting power in its entirety, and characterized in that said macro lens system is focused from an object point at infinity to an object point at a shorter distance by moving said first and second lens groups toward said object side, wherein said third lens is fixed, and wherein a space reserved between said front sub-group and said rear sub-group is decreased by said focusing from said object point at infinity to said object point at a shorter distance.

17. A macro lens system comprising, in order from an object to an image side:

a first lens group which is divided into a front sub-group having positive refracting power and a rear sub-group having negative refracting power, said first lens group having positive refracting power in its entirety;

a second lens group having positive refracting power in its entirety; and a third lens group having positive refracting power in its entirety, and characterized in that said macro lens system is focused from an object point at infinity to an object point at a shorter distance by moving said first and second lens groups toward said object side, wherein said third lens is fixed, and wherein a space reserved between said front sub-group and said rear sub-group is increased by said focusing from said object point at infinity to said object point at a shorter distance.

* * * * *